(12) United States Patent
Hatzav et al.

(10) Patent No.: US 8,830,328 B2
(45) Date of Patent: Sep. 9, 2014

(54) CAMERA-BASED DUPLEX IMAGING APPARATUS FOR IMAGING A DOCUMENT HAVING NO DOCUMENT EJECTION MECHANISM

(76) Inventors: Iuval Hatzav, Culver City, CA (US); Ilan Ben-Shahar, Savion (IL); Giyora Sharaby, Moshav Neve Yarak (IL); Daniel Hatzav, Hod Hasharon (IL)

(*) Notice: Subject to any disclaimer, the term of this patent is extended or adjusted under 35 U.S.C. 154(b) by 268 days.

(21) Appl. No.: 13/284,361

(22) Filed: Oct. 28, 2011

(65) Prior Publication Data

US 2013/0107056 A1    May 2, 2013

(51) Int. Cl.

| | |
|---|---|
| *H04N 7/18* | (2006.01) |
| *H04N 1/19* | (2006.01) |
| *H04N 1/195* | (2006.01) |
| *H04N 1/10* | (2006.01) |
| *G06K 9/20* | (2006.01) |
| *G06K 9/22* | (2006.01) |
| *H04N 1/203* | (2006.01) |

(52) U.S. Cl.
CPC .............. *H04N 1/19594* (2013.01); *H04N 1/19* (2013.01); *H04N 1/10* (2013.01); *G06K 9/2036* (2013.01); *G06K 9/228* (2013.01); *H04N 1/203* (2013.01); *G06K 9/2027* (2013.01)
USPC .............................. 348/159; 358/450; 355/23

(58) Field of Classification Search
CPC ... H04N 1/10; H04N 1/19; H04N 2201/0081; G06K 9/2027; G06K 9/2036; G06K 9/228
USPC .............................. 348/159; 358/450; 355/23
See application file for complete search history.

(56) References Cited

U.S. PATENT DOCUMENTS

| 6,348,962 B1* | 2/2002 | Nakagawa et al. ............. 355/23 |
| 8,203,764 B2* | 6/2012 | King et al. .................... 358/450 |
| 2009/0073503 A1* | 3/2009 | Lebaschi et al. ............. 358/450 |

\* cited by examiner

*Primary Examiner* — Jay Au
*Assistant Examiner* — Neil Mikeska

(57) ABSTRACT

A duplex imaging apparatus for imaging at least one side of a document, including a processor and lower and upper imaging devices. Each imaging device includes an optical-chamber, a camera and a light-source-configuration, facilitated to directly illuminate each face of the document from at least two illuminating angles. The lower imaging device is enclosed by a glass-window, wherein the document is operatively disposed on the glass-window. Each of the light source configurations includes at least one cluster of light sources, wherein the clusters of light sources are operated in a preconfigured sequence. Direct illumination forms hotspots in the acquired image frames at preconfigured locations, corresponding to the light sources positioning. The processor is facilitated to cutout preconfigured image frame portions containing the hotspots, forming clean portions of the image frames, and to combine the clean portions to form a clean output image frame.

15 Claims, 11 Drawing Sheets

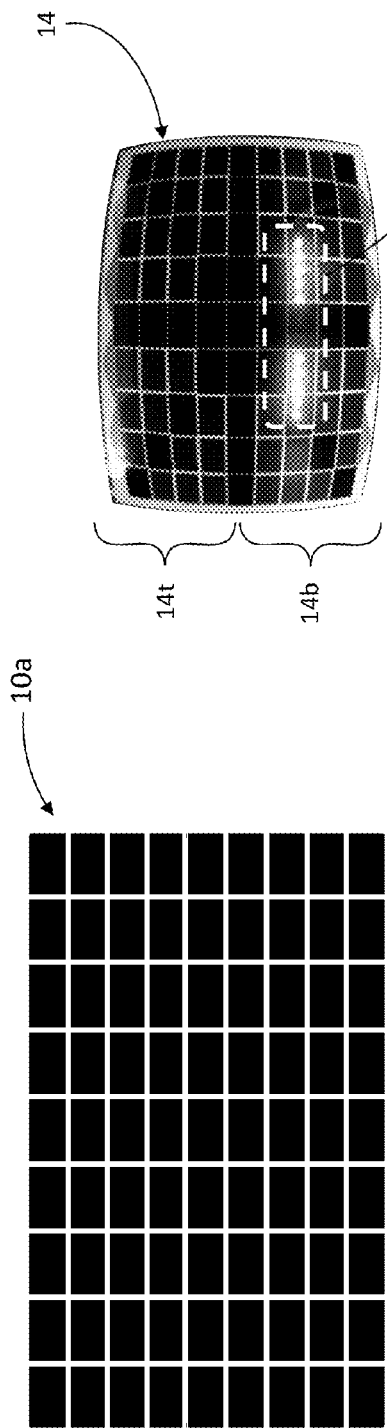
*Fig. 3b*
prior art
*Fig. 3d*
prior art
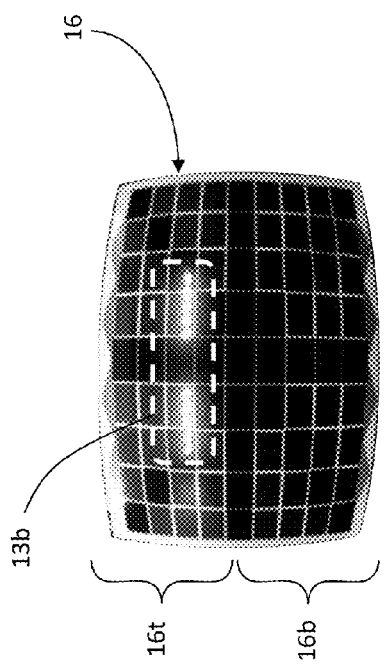
*Fig. 3a*
prior art
*Fig. 3c*
prior art

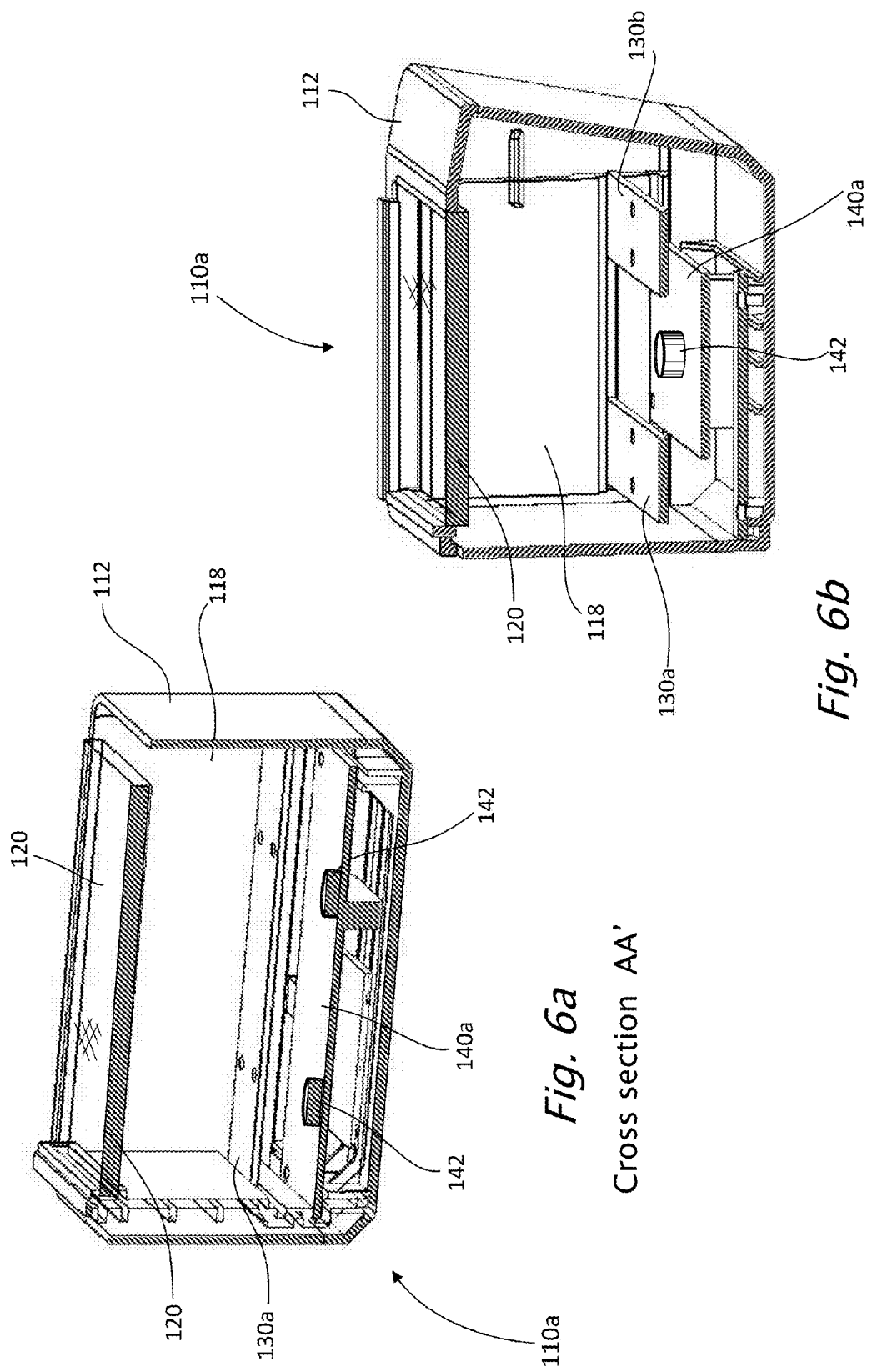

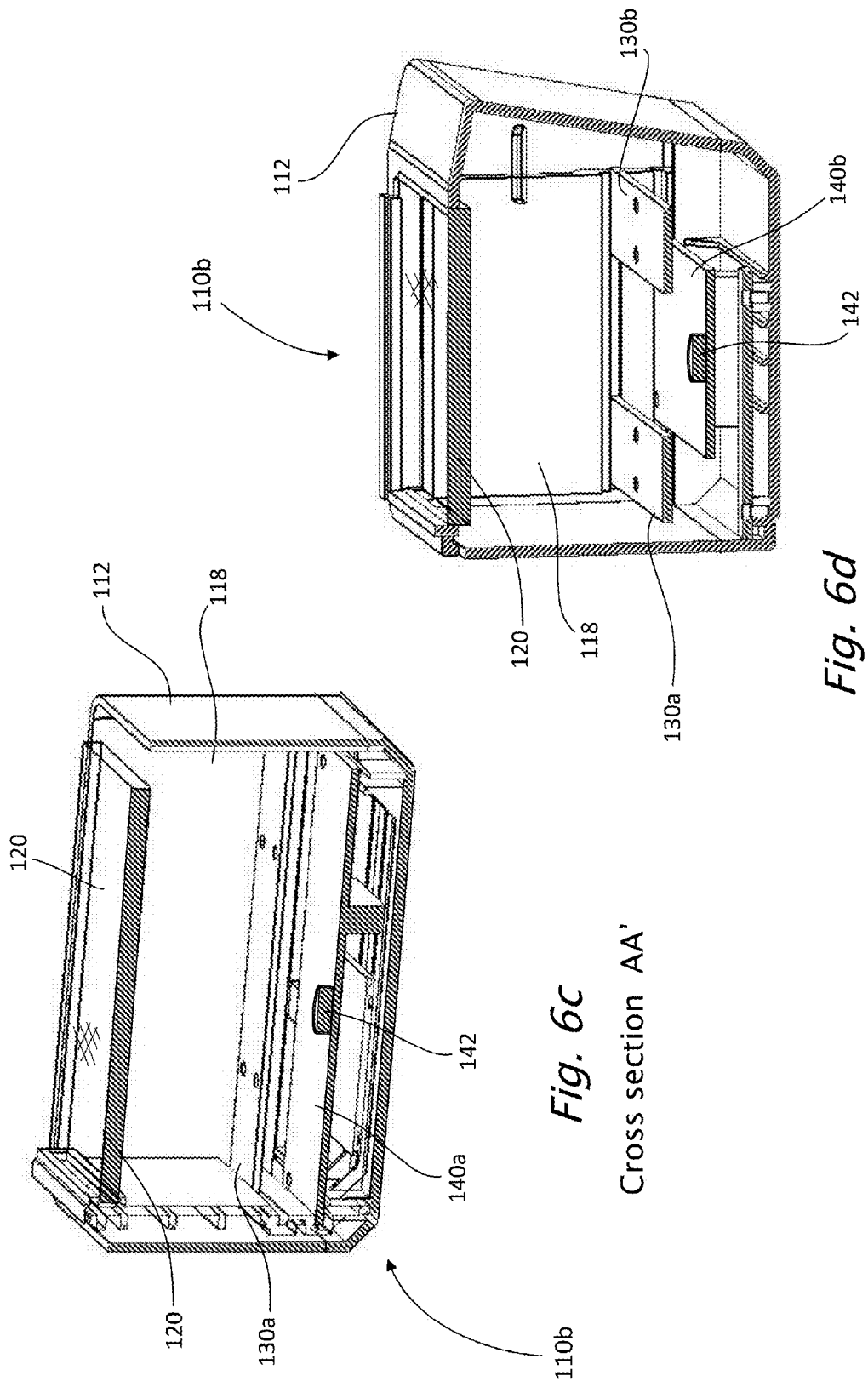

Cross section AA'

Cross section BB'

Cross section AA'

Cross section BB'

US 8,830,328 B2

CAMERA-BASED DUPLEX IMAGING APPARATUS FOR IMAGING A DOCUMENT HAVING NO DOCUMENT EJECTION MECHANISM

FIELD OF THE INVENTION

The present invention relates to apparatuses and methods for extracting data and more particularly, the present invention relates to an apparatus for acquiring digital image frames of one or both sides of identification documents such as driver's licenses, passports, and other similar identity cards and documents so as to extract data automatically with machine vision tools. The apparatus of the present does not require an ejection mechanism for removing the document from the apparatus.

BACKGROUND OF THE INVENTION

There exist in today's market imaging devices capable of reading documents such as ID cards, drivers license, business cards, passports, medical cards and the like. In imaging devices that include an imaging sensor array, based on technologies such as a CCD or CMOS, it is required to illuminate the imaged document. It is desired that the illumination will be of high intensity and substantially uniform, in order to obtain a substantially true image of the imaged document.

The document is typical place on the surface of a substantially flat and substantially transparent panel, typically, with no limitation, made of glass (herein, also referred to as "glass-window"). But the glass surface and the imaged document are also a reflective surface, returning a portion of the incident light rays striking the transparent glass surface. Thereby, the image frame acquired from the imaged document is distorted. An internal light source that directly illuminates the glass-window bring are reflected from the glass surface, thereby forming "hotspots" that distort the uniformity of the illumination of the imaged document, and thereby causing the image of the imaged document not to be a substantially true image of the imaged document.

U.S. Pat. No. 7,911,655 and US patent application 20110128360, by Hatzav et al., provide apparatuses for acquiring digital image frames of one or both sides of identification documents, having an illumination system configuration that reduces the hotspot problem, by disposing the light sources outside the field of view (FOV) of the camera. The hotspot problem is also addressed by Hatzav et al. in U.S. Pat. No. 7,948,665 and U.S. patent application Ser. Nos. 12/393,504 and 13/185,510.

U.S. patent application Ser. No. 13/223,342, by Hatzav et al., filed Sep. 1, 2011, provides an imaging device for imaging documents, wherein the document is directly illuminated from at least two illuminating angles, and wherein the output image frame does not contain hotspots formed as a result of the direct illumination of either of the at least two illuminating angles.

U.S. patent application Ser. No. 13/223,342, in incorporated by reference for all purposes as if fully set forth herein. Reference is now made to FIG. 1 (prior art), a side view illustration of an imaging device 80, according to U.S. patent application Ser. No. 13/223,342, wherein a side wall has been removed for illustration purposes only. Imaging device 80 includes a body 40 enclosing an imaging-optical-chamber 70, a camera 50, two or more clusters of light sources 30, a glass-window 20 and a processor 90. Reference is also made to FIG. 2 (prior art), a perspective view illustration of imaging device 80. It should be noted that in FIGS. 1 and 2, a side wall has been removed for illustration purposes only.

Camera 50 is disposed on the internal surface of a camera wall 55 such that, preferably, the FOV 60 of lens 52 of camera 50 views at least the whole of glass-window 20. Typically, camera wall 55 is disposed opposite to glass-window 20. Typically, clusters of light sources 30 are also disposed on the internal surface of camera wall 55 such that clusters of light sources 30 are not directly viewed by the FOV 60 of camera 50.

The operation of imaging device 80 is explained through an example supported by FIGS. 3a-3d. FIG. 3a depicts an example document 10a, containing 9×9 rectangles arranged in a larger rectangle and separated by white gaps.

The method of the present invention is exemplified, with no limitations, in FIGS. 3b-3d. The two clusters of light sources 30a and 30b are alternately activated, at a preconfigured activation rate. When light source cluster 30a is ON, light source cluster 30b is OFF, and vice versa. Each image frame is subdivided, for example, into two sections, a top section and a bottom section, wherein "top" and "bottom" refer to the image frames (14, 16 and 18), as seen in FIGS. 3b-3c.

FIG. 3b depicts an example image frame 14 of document 10a, acquired by imaging device 80, wherein a first cluster of light sources 30a is activated, forming a respective hotspots 13a within the bottom section 14b of image frame 14.

Similarly, FIG. 3c depicts an example image frame 16 of document 10a, acquired by imaging device 80, wherein a second cluster of light sources 30b is activated, forming a respective hotspots 13b within the top section 16t of image frame 16.

FIG. 3d depicts an example output image frame 18 of document 10a, composed from portions of the image frames 14 and 16. The acquired image frames are stored in memory, operatively coupled with processor 90. Each pair of the acquired image frame, 14 and 16, includes an image frame section that is clean of hotspots formed by a cluster of light sources 30. In image frame 14 the top section 14t is clean of hotspots formed by a cluster of light sources 30, and in image frame 16 the bottom section 16b is clean of hotspots formed by a cluster of light sources 30. Processor 90 concatenates the top section 14t of image frame 14 onto the bottom section 16b image frame 16, thereby forming a new image frame 18, contains substantially no hotspots.

In prior art imaging device for imaging documents that facilitates imaging both sides of the document (also referred to as a "duplex imaging device" or a "duplex imaging apparatus"), substantially simultaneously, an ejection mechanism is required for removing the document from the duplex imaging device, since the whole document is typically inserted in a slot between two glass windows. The ejection mechanism is typically complex, cumbersome and burdensome the duplex imaging device as a whole.

Prior art duplex imaging devices also take measures to overcome the partial transparency of some documents, such as paper documents, as the illumination of a first side of the document is viewed as direct illumination by the camera set to image the second side of the document. Some prior art attempts to solve this problem provided complex solutions, for example, in U.S. Pat. No. 7,388,691, by Kuo-Jeng Wang.

Thus there is a need for and it would be advantageous to have a duplex imaging apparatus that does not require a complex and cumbersome ejection mechanism for removing the document from the apparatus.

SUMMARY OF THE INVENTION

In view of the limitations now presented in the prior art, the present invention provides a new, simple and useful duplex imaging apparatus for imaging documents that in effect, facilitates enhancement of the uniformity and intensity of the document illumination, utilizing an image sensor array and alternating clusters of light sources, disposed in preconfigured location inside the housing of the imaging device.

The term "cluster of light sources", as used herein, refers to a single light source, composed of one or more light emitting devices, such as, with no limitation a LED light source, are activated or deactivated as a single unit. When activated, the cluster of light sources directly illuminates at least a portion of the imaged document, at a preconfigured illuminating angle.

The term "alternately operating" in relation to the operation of all clusters of light sources, as used herein, refers to the activation of all of the clusters of light sources, one at a time, in a preconfigured sequence.

It is then a principle intention of the present invention to provide a duplex imaging apparatus for imaging documents that has a small form and that includes a direct illumination system that provides an output image frame of the imaged document that contains substantially no hotspots.

The present invention is an improved duplex imaging apparatus for imaging documents, wherein each side of the document is directly illuminated by at least two clusters of light sources. Each cluster of light sources illuminates a document face in a different illuminating angle. That is, each point in the document face is illuminated from at least two different angles. Thereby, each cluster of light sources forms a hotspot at a different location in the acquired image frames. Since the clusters of light sources are alternately operated, and acquiring an image frame when either of the clusters of light sources is activated, the portion of an image frame, containing the hotspots, can be replaced by a respective portion of an image frame, taken from a corresponding image frame acquired when a different cluster of light source was activated. Therefore, the output image frame does not contain any of the hotspots formed as a result of the direct illumination of the clusters of light sources.

According to the teachings of the present invention, there is provided a duplex imaging apparatus for imaging at least one side of a document, such as an identity document, having a first side and a second side, the apparatus including a processor and memory coupled to operate with the processor, a lower imaging device and an upper imaging device.

The lower imaging device includes an enclosed lower-optical-chamber, at least one lower-camera mounted inside the lower-optical-chamber, and a lower light-source-configuration, disposed inside the enclosed lower optical-chamber, facilitated to directly illuminate the first side of the document from at least two illuminating angles. The lower imaging device further includes a glass-window, wherein the document is operatively disposed on the external surface of the glass-window, and wherein the first side of the document is disposed adjacently to the external surface of the glass-window.

The upper imaging device includes an upper-optical-chamber, at least one upper-camera mounted inside the upper-optical-chamber, and a upper light-source-configuration, disposed inside the enclosed upper optical-chamber, facilitated to directly illuminate the first side of the document from at least two illuminating angles.

Each of the light source configurations includes at least one cluster of light sources, wherein the clusters of light sources are operated in a preconfigured sequence.

The lower-camera is preconfigured to acquire an image frame of a portion of the first side of the document being imaged and store the acquired image frame in the memory, and the image acquisition is operatively coupled with the activation of each of the light sources of the lower light-source-configuration at each of the at least two illuminating angles. Similarly, the upper-camera is preconfigured to acquire an image frame of a portion of the second side of the document being imaged and store the acquired image frame in the memory, and the image acquisition is operatively coupled with the activation of each of the light sources of the upper light-source-configuration at each of the at least two illuminating angles.

A space is formed between the glass-window and the upper-camera, facilitating the insertion of at least a portion of a user's hand, for insertion and removal of the document.

Typically, hotspots are operatively formed in the acquire an image frames at preconfigured locations, wherein the processor is facilitated to cutout the preconfigured image frame portions containing the hotspots, forming clean portions of the acquired image frame portions.

The processor is further facilitated to combine the clean portions of acquired image frames of the first side of the document, to form a first output image frame of the portion of the first side of the document, and similarly, the processor is facilitated to combine the clean portions of acquired image frames of the second side of the document, to form a second output image frame of the portion of the second side of the document.

Typically, to prevent cross-illumination from forming in the clean portions of the acquired image frame portions, cross-illuminations are preconfigured not to form in the clean portions of the acquired image frame portions, by appropriately positioning the clusters of light sources inside the respective lower-optical-chamber and upper-optical-chamber.

Typically, each of the light source configurations includes at least two clusters of light sources.

Optionally, each individual light source of the light source configuration is selected from the group of light sources type, including infra red (IR), ultra violate (UV) and visible light (VL).

Optionally, each individual light source of the light source configuration is selected from the group including LED, halogen light sources and fluorescence image.

Preferably, all walls of the optical chamber are opaque, except for the glass-window.

Preferably, all internal walls of the optical-chambers, except for the glass-windows, are painted in black.

Optionally, one or both the light source configurations include a cluster of light sources and a mechanism for deflecting the light beams emitted from the cluster of light sources, wherein the mechanism for operatively deflecting the light beams to the at least two illuminating angles.

An aspect of the present invention is to provide a method for imaging a document, including the step of providing an duplex imaging apparatus as described hereabove, wherein the clusters of light sources are preconfigured to directly illuminating the portions of the document being imaged. The method further includes the step of performing the following sequence of image acquisition steps, in a preconfigured order, for all preconfigured sets of the clusters of light sources:

i. Activating the next set of clusters of light sources to directly illuminating the preconfigured sides of the document being imaged.
  ii. Acquiring corresponding image frames of at least a portion of the preconfigured sides of the document.
  iii. Deactivating the next set of clusters of light sources.

iv. Discarding a preconfigured portion of the acquired image frames, thereby sustaining only clean portion of the acquired image frames.

The method further includes the step of combining the clean portions of each of the preconfigured sides of frames to form an output image frame for each the preconfigured sides of the document.

In some embodiment of the present invention, the set of the clusters of light sources includes one cluster of light sources, wherein one image frame is acquired upon the activation of the one cluster of light sources, on the side of the document being illuminated by the one cluster of light sources. Typically, the preconfigured sides of the document include both sides of the document.

In other embodiment of the present invention, the set of the clusters of light sources includes a pair of clusters of light sources. One cluster of light sources illuminates the first side of the document and the other cluster of light sources illuminates the second side of the document. The image frames of both sides of the document are acquired upon the activation of the clusters of light sources wherein hotspots are formed in the acquired image frames at preconfigured noisy locations. Preferably, cross-illuminations are preconfigured to form substantially at the preconfigured noisy locations.

Optionally, the sequence of image acquisition steps is performed a preconfigured number of times, wherein in each of the sequence of image acquisition steps, the illumination intensity of the sets of said clusters of light sources, is different with respect to the other sequences of image acquisition steps.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein:

FIG. 3a (prior art) depicts an example document;

FIG. 3b (prior art) depicts an image frame of the document shown in FIG. 3a, acquired by the imaging device of the present invention, wherein a first cluster of light sources is activated;

FIG. 3c (prior art) depicts an image frame of the document shown in FIG. 3a, acquired by the imaging device of the present invention, wherein a second cluster of light sources is activated;

FIG. 3d (prior art) depicts the output image frame of the document shown in FIG. 3a, composed from portions of the image frames shown in FIGS. 3b and 3c;

FIG. 6a is a side perspective, cross-section (AA') view of the lower imaging device of the duplex imaging apparatus shown in FIG. 4.

FIG. 6b is a side perspective, cross-section (BB') view of the lower imaging device of the duplex imaging apparatus shown in FIG. 4.

FIG. 6c is a side perspective, cross-section (AA') view of another variation of the lower imaging device of the duplex imaging apparatus shown in FIG. 4.

FIG. 6d is a side perspective, cross-section (BB') view of the variation of the lower imaging device shown in FIG. 6c.

DETAILED DESCRIPTION OF THE INVENTION

Figure 1:
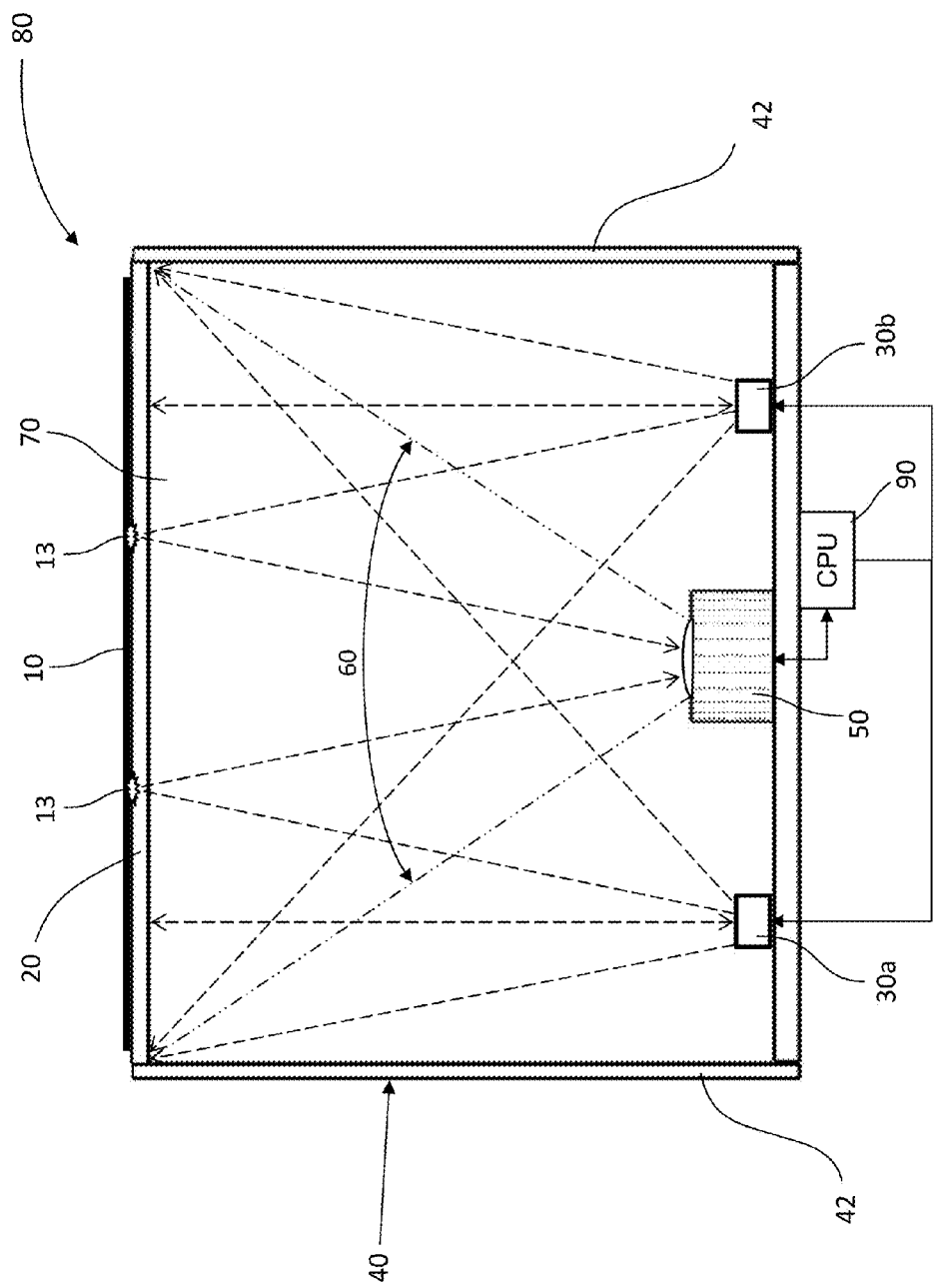
FIG. 1 (prior art) is a side view illustration of an imaging device having alternating clusters of light sources, thereby facilitating hotspot elimination from the output image frame.
Figure 2:
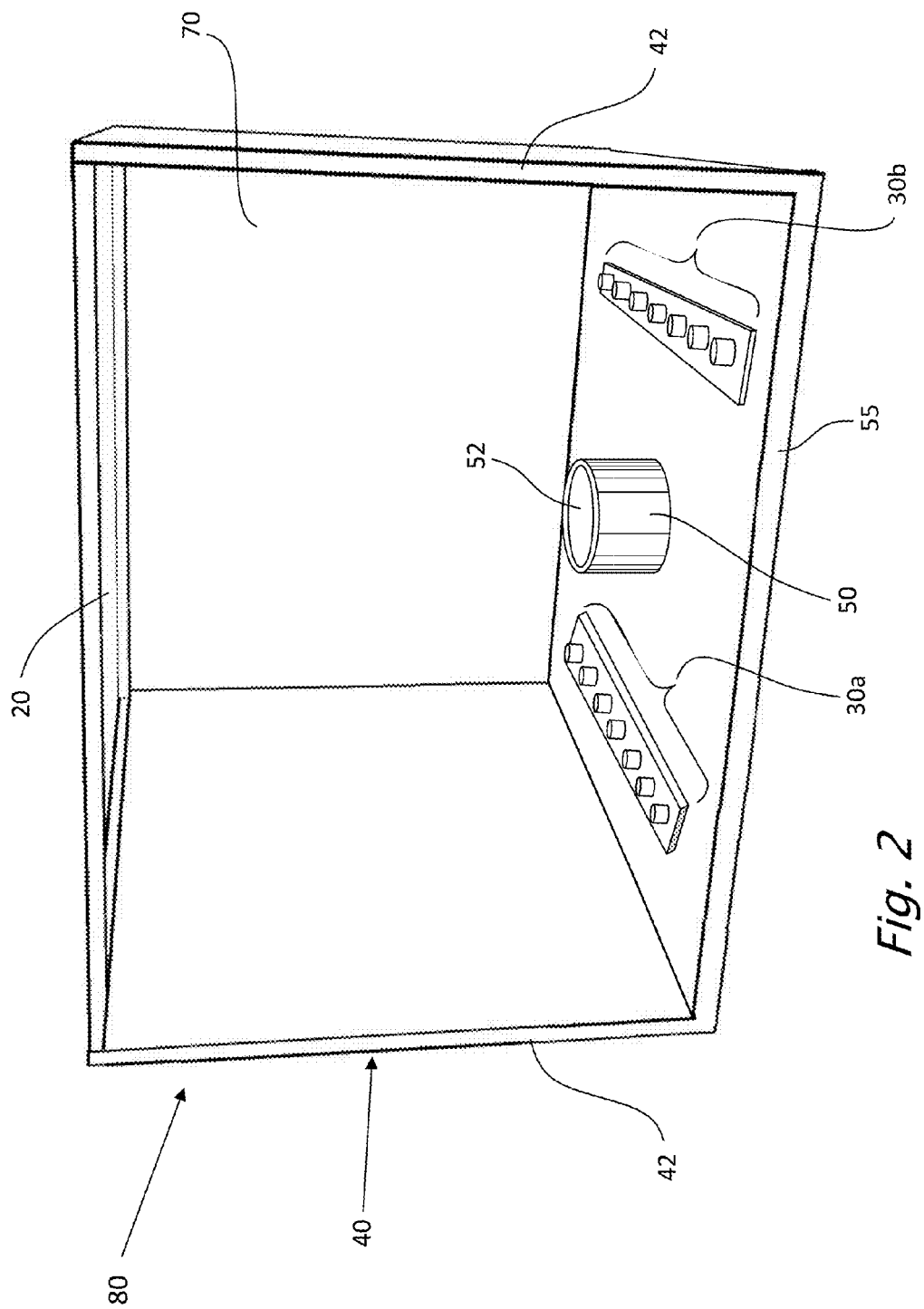
FIG. 2 (prior art) is a perspective view illustration of the imaging device shown in FIG. 1, wherein a side wall has been removed for illustration purposes only.

Before explaining embodiments of the invention in detail, it is to be understood that the invention is not limited in its application to the details of construction and the arrangement of the components set forth in the host description or illustrated in the drawings. Unless otherwise defined, all technical and scientific terms used herein have the same meaning as commonly understood by one of ordinary skill in the art of the invention belongs. Any methods and examples provided herein are illustrative only and not intended to be limiting.

Figure 4:
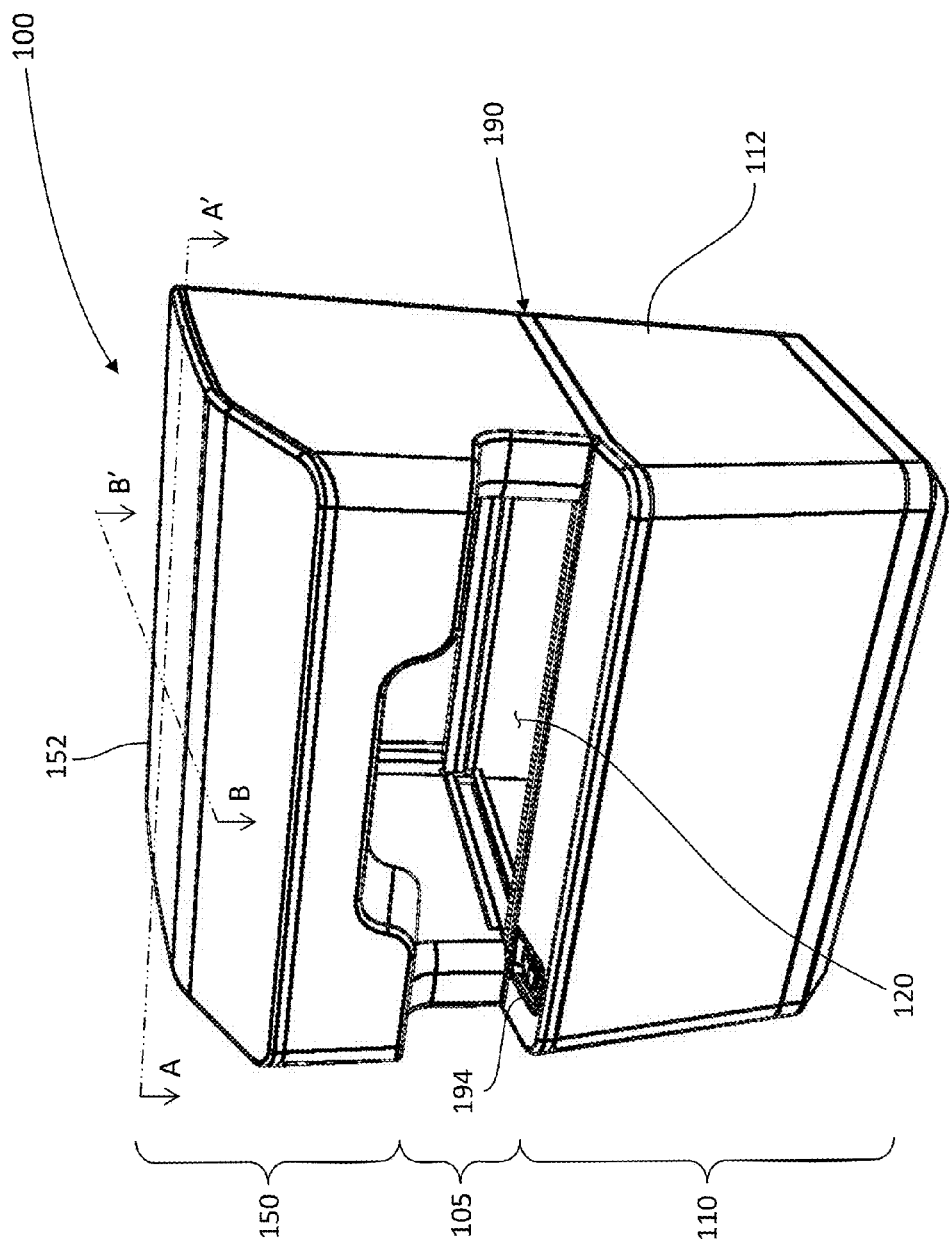
FIG. 4 is a perspective view illustration of a duplex imaging apparatus having alternating clusters of light sources, according to embodiments of the present invention.

Reference is now made to FIG. 4, a perspective view illustration of a duplex imaging apparatus 100, according to embodiments of the present invention. Duplex imaging apparatus 100 includes a processor coupled with memory and a housing 190 accommodating a lower imaging device 110, an upper imaging device 150 and an aperture 105 formed in between lower imaging device 110 and upper imaging device 150. It should be noted that orientation-related descriptions such as "lower" imaging device and "upper" imaging device, assumes that duplex imaging apparatus 100 is in operationally disposed on a generally horizontal supporting surface.

Figure 5:
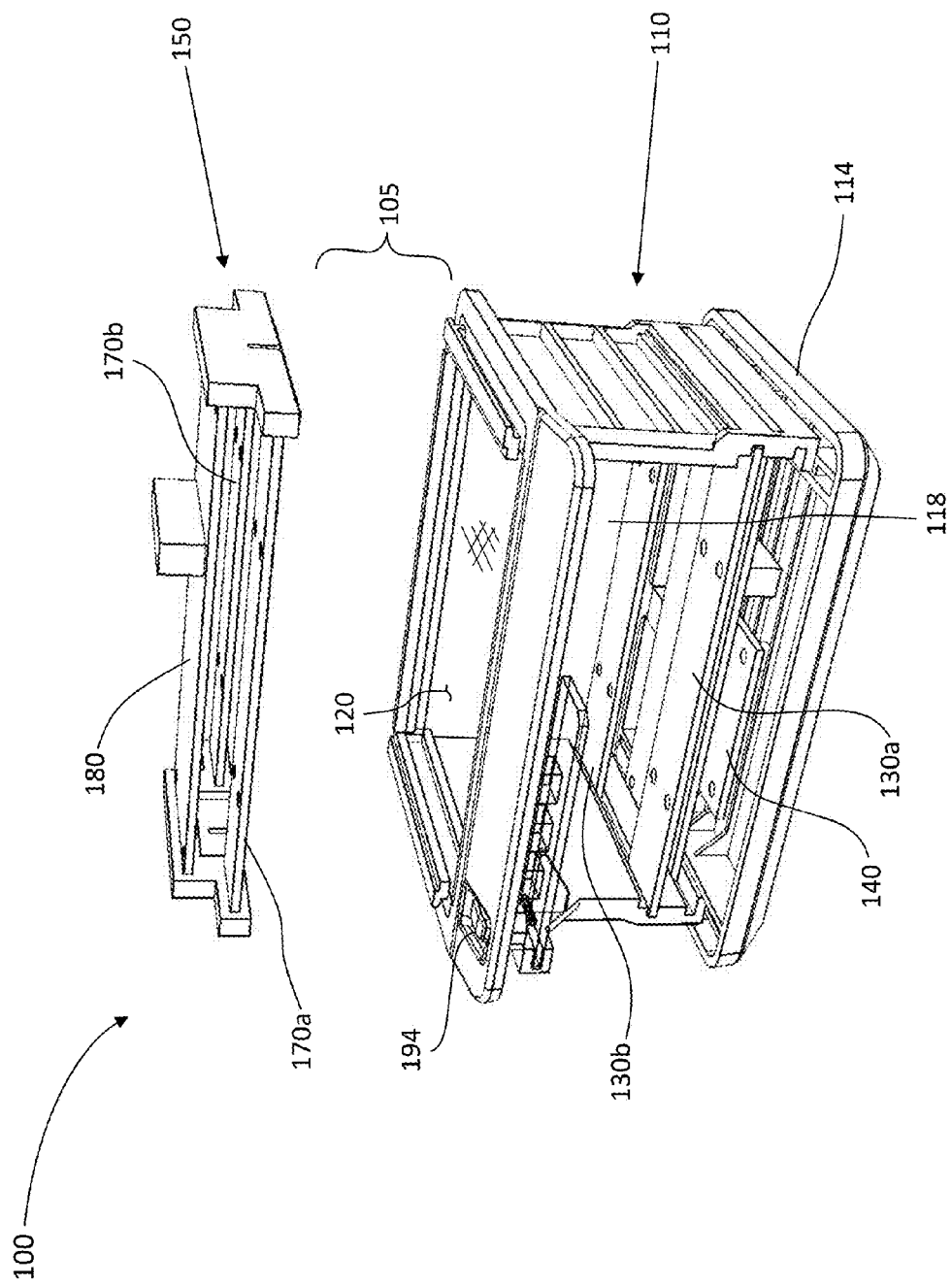
FIG. 5 is a perspective view illustration of the duplex imaging apparatus shown in FIG. 4, wherein most of the apparatus housing has been removed for illustration purposes only.

Reference is also made to FIG. 5, a perspective view illustration of duplex imaging apparatus 100, wherein most of housing 190 has been removed for illustration purposes only. Lower imaging device 110 of duplex imaging apparatus 100 includes a housing portion 112 (see FIG. 4) enclosing an imaging-optical-chamber 118, which optical chamber includes a camera unit 140, two or more clusters of light sources 130 and a glass-window 120. Similarly, upper imaging device 150 of duplex imaging apparatus 100 includes a housing portion 152 (see FIG. 4) enclosing an imaging-optical-chamber, which optical chamber includes a camera unit 180 and two or more clusters of light sources 170.

Glass-window 120 is disposed in a preconfigured distance from the lens of camera unit 140 such that a document 10, placed on top of glass-window 120, will be within the focus of the image sensor of camera unit 140 and the focus of the image sensor of camera unit 180. The space 105 formed between camera unit 180 and glass-window 120, facilitates a comfortable manual placement and removal of document 10, for example by a user's hand.

Reference is also now made to FIGS. 6a and 6b, showing side perspective, cross-section (AA' and BB', respectively) views of a preferred variation of lower imaging device 110a of duplex imaging apparatus 100. Lower imaging device 110a of duplex imaging apparatus 100 encloses an imaging-optical-chamber 118, and includes a camera unit 140 having at least two imaging sensors 142, two or more clusters of light sources 130 and a glass-window 120.

In FIGS. 6c and 6d, a side perspective, cross-section (AA' and BB', respectively) view of another variation of lower imaging device 110b of duplex imaging apparatus 100. Lower imaging device 110b of duplex imaging apparatus 100 encloses an imaging-optical-chamber 118, and includes a camera unit 140 having an imaging sensor 142, two or more clusters of light sources 130 and a glass-window 120.

Image sensors 142 are disposed on the internal surface of the camera circuit board 140 such that, preferably, the FOV of camera unit 140 views at least a portion of glass-window 120, typically the whole of glass-window 120. Typically, camera circuit board 140 is disposed opposite to glass-window 120. Typically, clusters of light sources 130 are also disposed opposite to glass-window 120, such that clusters of light sources 130 are not directly viewed by the FOV of camera unit 140.

Figure 7A:
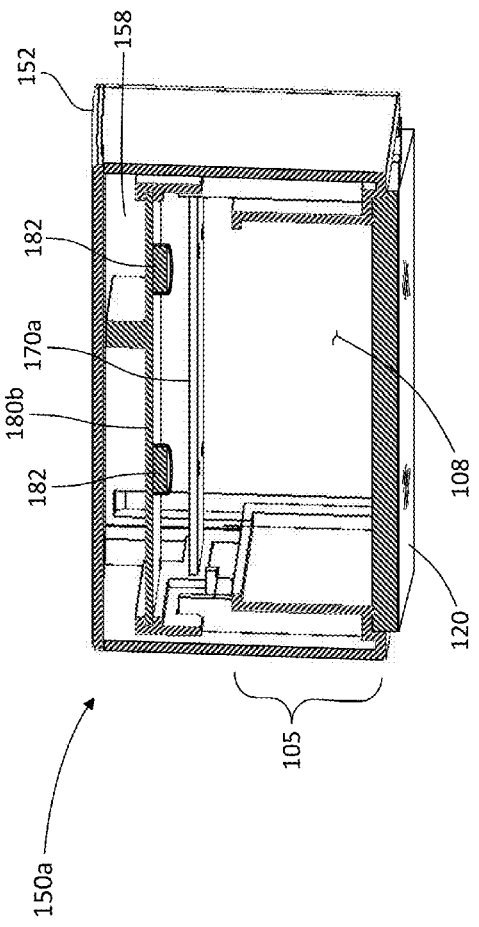
FIG. 7a is a side perspective, cross-section (AA') view of the lower imaging device of the duplex imaging apparatus shown in FIG. 4.
Figure 7B:
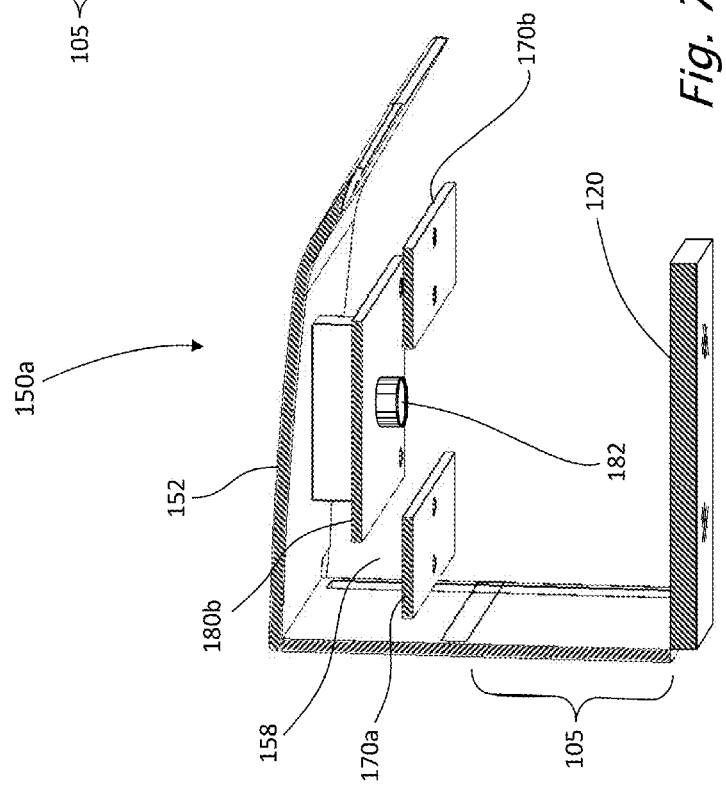
FIG. 7b is a side perspective, cross-section (BB') view of the lower imaging device of the duplex imaging apparatus shown in FIG. 4.

Reference is also now made to FIGS. 7a and 7b, showing side perspective, cross-section (AA' and BB', respectively) views of a preferred variation of upper imaging device 150a of duplex imaging apparatus 100. Upper imaging device 150a of duplex imaging apparatus 100 an imaging-optical-chamber 158, and includes a camera unit 180 having at least two imaging sensors 182 and two or more clusters of light sources 170.

It should be noted that imaging-optical-chamber 158 is not fully enclosed, and external light might enter aperture 105 formed in between lower imaging device 110 and upper imaging device 150. But taking advantage of the high intensity of light emitted from clusters of light sources 170 and which illumination illuminates the back side of document 10, the direct illumination overcomes substantially any common illuminating disturbance coming from external lights sources.

Figure 7C:
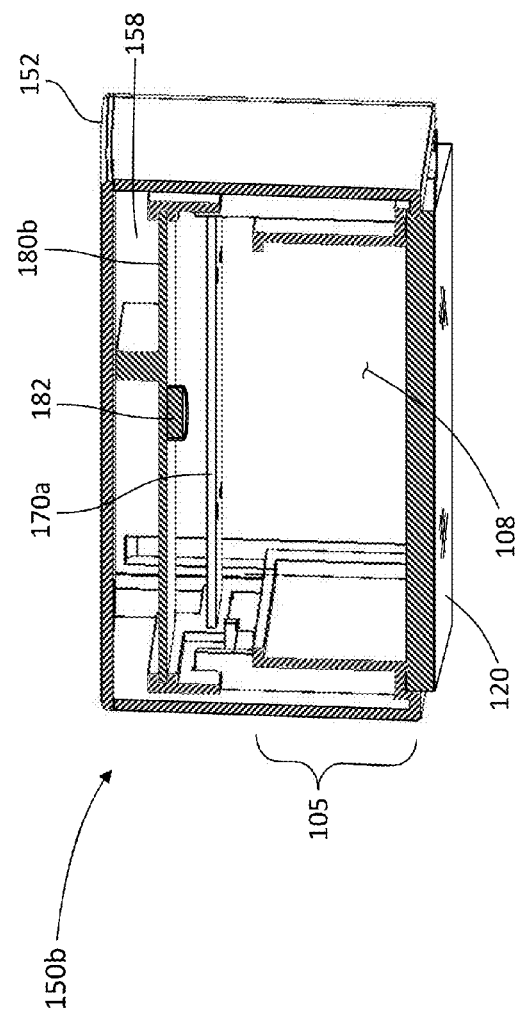
FIG. 7c is a side perspective, cross-section (AA') view of another variation of the lower imaging device of the duplex imaging apparatus shown in FIG. 4.
Figure 7D:
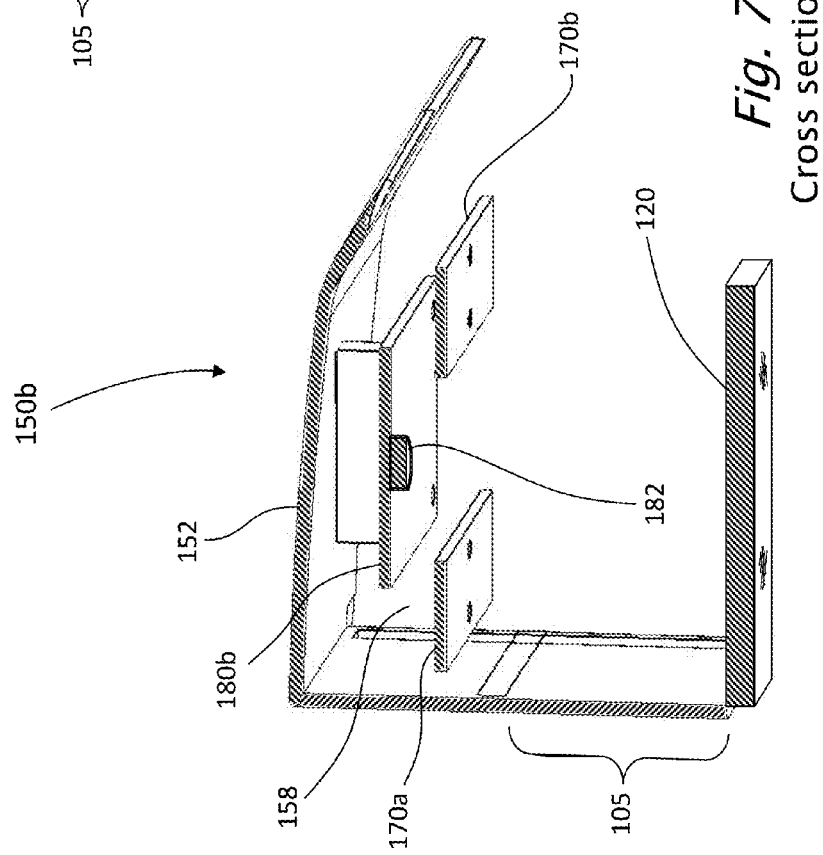
FIG. 7d is a side perspective, cross-section (BB') view of the variation of the lower imaging device shown in FIG. 7c.

In FIGS. 7c and 7d, a side perspective, cross-section (AA' and BB', respectively) view of another variation of upper imaging device 150b of duplex imaging apparatus 100. Upper imaging device 150b of duplex imaging apparatus 100 encloses an imaging-optical-chamber 158, and includes a camera unit 180 having an imaging sensor 182 and two or more clusters of light sources 170.

Image sensors 182 are disposed on the internal surface of the camera circuit board 180 such that, preferably, the FOV of camera unit 180 views at least a portion of glass-window 120, typically the whole of glass-window 120. Typically, camera circuit board 180 is disposed opposite to glass-window 120. Typically, clusters of light sources 170 are also disposed opposite to glass-window 120, such that clusters of light sources 170 are not directly viewed by the FOV of camera unit 180.

The operation of lower imaging device 110 and upper imaging device 150 is similar to the operation of imaging device 80, as provided by U.S. patent application Ser. No. 13/223,342.

Following the example depicted in FIGS. 3a-3d, where a document 10a, containing 9×9 rectangles arranged in a larger rectangle and separated by white gaps, and a sequence-cycle of obtaining an image frame 18, containing substantially no hotspots.

Figure 8:
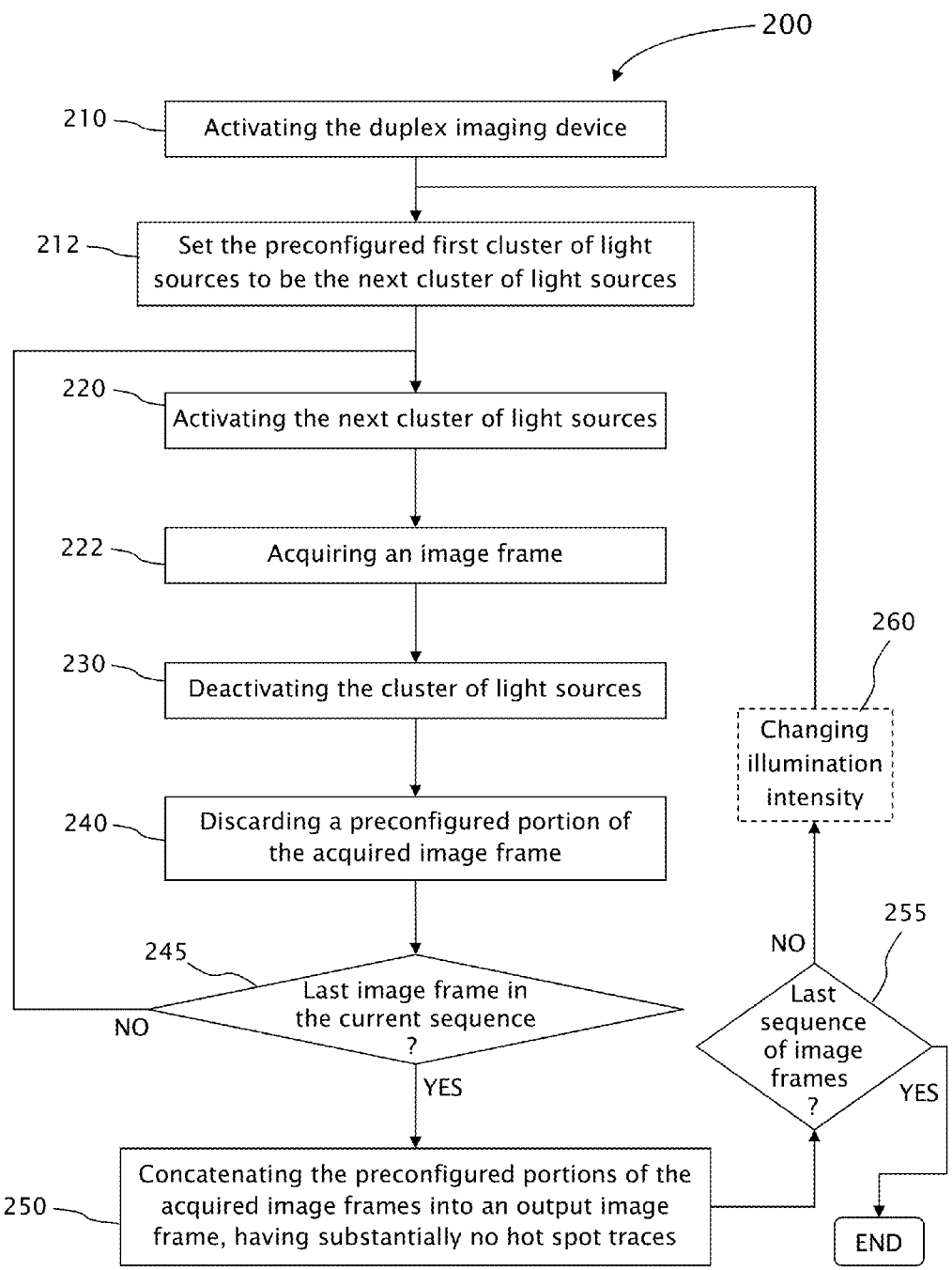
FIG. 8 outlines an exemplary method of obtaining an output image frame that contains substantially no hotspot traces, in a duplex document imaging apparatus.

A first exemplary method 200 of obtaining an output image frame that contains substantially no hotspot traces, in a duplex document imaging apparatus 100, having a lower imaging device 110 and an upper imaging device 150, is outlined in FIG. 8. In method 200, light clusters are activated, one at a time, in a preconfigured sequence. Method 200 includes the following steps:

Step 210: activating duplex imaging apparatus 100.

Duplex imaging apparatus 100, having lower imaging device 110 and upper imaging device 150, each with alternating clusters of light sources 130 and 170, respectively, and each preconfigured to acquire sequences of image frames. When a cluster of light sources 130 or 170 is turned ON (activated), the other clusters of light sources 130 and 170 are turned OFF (deactivated). A corresponding image sensor 142 or 182 is activated simultaneously with the activated light cluster 130 or 170.

The order at which the cluster of light sources 130 or 170 are activated is not important, as long as only one cluster of lights (130 or 170) may be ON at any point in time. Typically, the cycle order maybe {130a, 130b, 170a, 170b}, {170a, 170b, 130a, 130b}, {130a, 130b, 170b, 170a} or any other order.

Typically, the length of a sequence of acquiring image frames corresponds to the number of different alternating clusters of light sources 130 being activated. In the example shown in FIGS. 3b-3d, the length of the sequence is typically 4: 2 for lower imaging device 110 and 2 for upper imaging device 150, totaling 4 image frames.

Step 212: Set the preconfigured first cluster of light sources to be the next cluster of light sources.

The sequence of activation of the clusters of light sources and the acquiring of the image frames in each cycle, providing an output image frame, is preconfigured. Initially, the first cluster of light sources in the sequence is set to be the next cluster of light sources.

Step 220: activating the next cluster of light sources 130 (or 170).

The next cluster of light sources 130 or 170 is turned ON, while the other clusters of light sources 130 and 170 are kept OFF.

Step 222: acquiring an image frame.

While the next cluster of light sources is ON, the appropriate image sensor(s) (142 or 182) acquires an image frame. The acquired image frame(s) contains a cluster of hotspots on the side of the image frame respective to the preconfigured positioning of the activated cluster of light sources (130 or 170).

For example, referring back to FIGS. 6a and 6b (or 6c and 6d) as well as to FIGS. 7a and 7b (or 7c and 7d), an image frame of document 10 is acquired by image sensor(s) 142 when the next cluster of light sources 130b (or 170a or 170b) is turned ON, while the other clusters of light sources 130a and 170 are kept OFF. The acquired image frame(s) contains a cluster of hotspots on the side of each image frame where next cluster of light sources 130b (or 170a or 170b) is disposed.

In the example shown in FIGS. 3a-3d, image frame 14 of document 10a, may be acquired when the first cluster of light sources 130a is turned ON. The acquired image frame 14 contains a cluster of hotspots 13a within the bottom section 14b of image frame 14, respective to the disposition of first cluster of light sources 130*a* inside imaging-optical-chamber 118.

Similarly, image frame 16 of document 10*a*, may be acquired when cluster of light sources 130*b* is turned ON. The acquired image frame 16 contains a cluster of hotspots 13*a* within the bottom section 16*t* of image frame 16, respective to the disposition of first cluster of light sources 130*b* inside imaging-optical-chamber 118.

Step 230: deactivating the activated cluster of light sources 130 (or 170).

The activated next cluster of light sources 130 or 170 is turned OFF, thereby all clusters of light sources 130 and 170 are now OFF.

Step 240: discarding a preconfigured portion of the acquired image frame.

A preconfigured portion of the acquired image frames, containing the hotspots, caused by the direct illumination of the cluster of light sources 130, is discarded.

In the example shown in FIGS. 3*a*-3*d*, after image frame 14 is acquired, the bottom section 14*b* of image frame 14 is discarded. Similarly, after image frame 16 is acquired, the top section 16*t* of image frame 16 is discarded.

Step 245: check if this is the last image frame in the current cycle of sequence of image frames.

If the acquired image frame is the last image frame in the current cycle of sequence has been acquired, go to step 250.

Else, go to step 220.

Step 250: concatenating the preconfigured portions of the acquired image frames into an output image frames, having substantially no hotspot traces that were formed in the acquired image frames.

The preconfigured portions of the acquired image frames in a sequence, having substantially no hotspot traces that were formed in the acquired image frames, are concatenated in a preconfigured pattern, to thereby form an output image frame.

In the example shown in FIGS. 3*a*-3*d*, the processor concatenates top section 14*t* of image frame 14 onto bottom section 16*b* image frame 16, thereby forming a new image frame 18 (see FIG. 3*d*). Image frame 18 contains substantially no hotspot traces that were originally formed from image frames 14 and 16.

Step 255: optionally, check if this is the last cycle-sequence of image frames.

Optionally, if this is not the last cycle-sequence of image frames, go to step 212.

Step 260: changing illumination intensity.

Optionally, each image frame acquisition taken is one of a sequence of image frames, wherein the intensity of the illumination is changed slightly during the vertical blank between consecutive frame acquisitions, of the video frame sequence. This facilitates a better pairing of image frames during concatenation step 250, such that the seam-line formed when concatenating the portions of the acquired image frames, is substantially invisible. It should be noted that for each of solely activated cluster of light sources 130 and 170, an image frame is acquired. The clusters of light sources 130 and 170 are activated in sequence, such that there is no light interference caused by the partial transparency of some documents, such as paper documents. Therefore, partial transparency of documents has no affect on the acquired images.

It should be further noted that the order of steps may vary. For example, loop steps 255 and optionally 260 may be performed during a vertical blank of a video frame sequence, starting after step 222 and closing the loop at the entrance of step 220.

Figure 9:
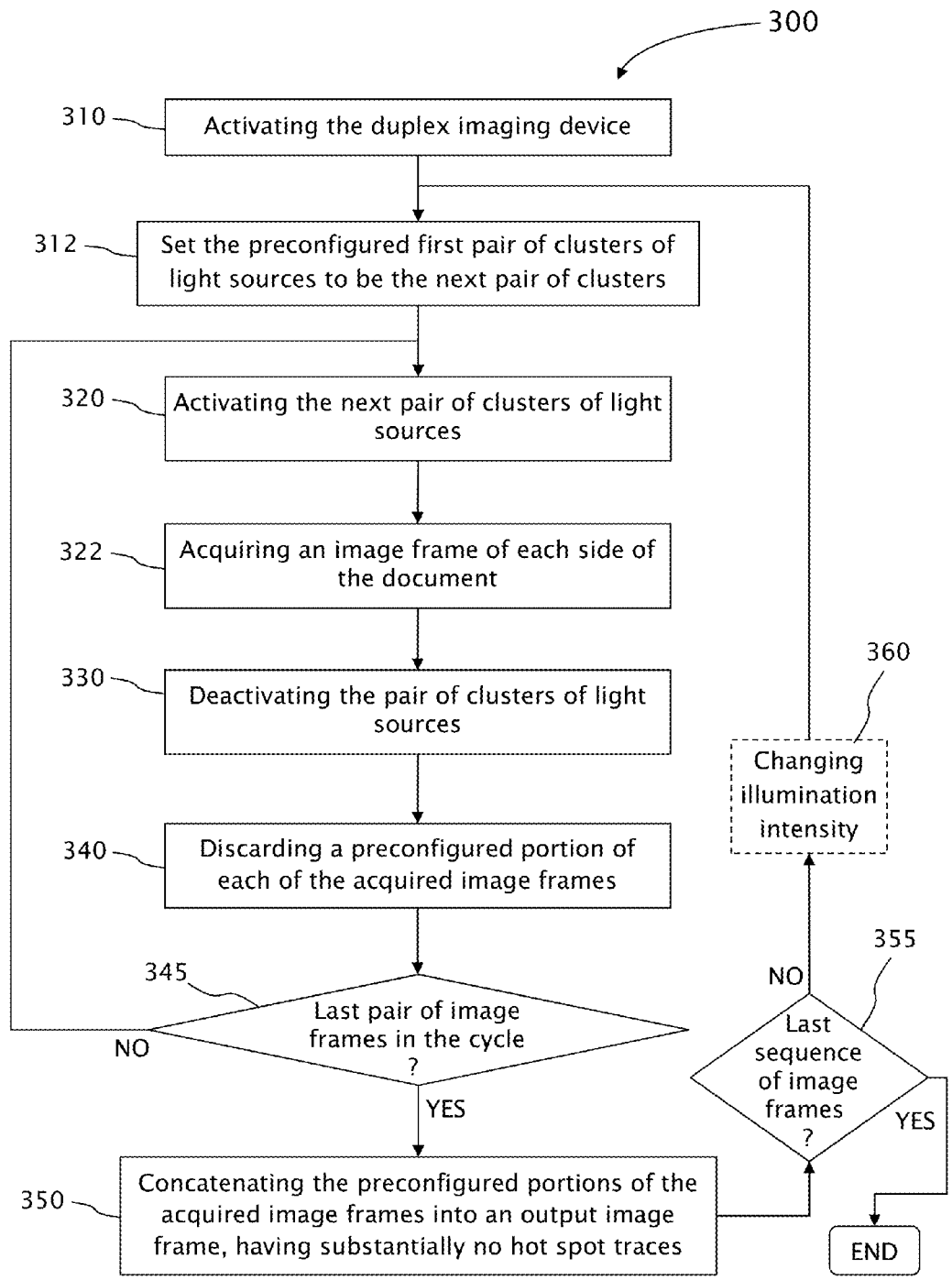
FIG. 9 outlines another exemplary method of obtaining an output image frame that contains substantially no hotspot traces, in a duplex document imaging apparatus.

A second exemplary method 300 of obtaining an output image frame that contains substantially no hotspot traces, in a duplex document imaging apparatus 100, having a lower imaging device 110 and an upper imaging device 150, is outlined in FIG. 9. In method 300, the clusters light sources 130 and 170 are activated in pairs, in a preconfigured sequence. Each pair of clusters of light sources includes one cluster of light sources 130 from lower imaging device 110 and one cluster of light sources 170 from upper imaging device 150.

The pair of clusters light sources 130 and 170 are disposed inside imaging-optical-chamber 118 and 158, respectively, such that when document 10 is partially transparent, cluster of light sources 130 directly illuminates the corresponding image sensor 182, thereby forming an image of cluster of light sources 130 in the images frame acquired by image sensor 182. Similarly, cluster of light sources 170 directly illuminates the corresponding image sensor 142, thereby forming an image of cluster of light sources 170 in the images frame acquired by image sensor 142.

The image of cluster of light sources 130, formed in the image frame acquired by image sensor 182, is preconfigured to be at or proximal to the location of the hotspots formed in the image frame acquired by image sensor 182. Thereby, when discarding the preconfigured portion of the acquired image frame, containing the hotspots, the image of cluster of light sources 130, formed in the image frame acquired by image sensor 182, is discarded as well. Similarly, the image of cluster of light sources 170, formed in the image frame acquired by image sensor 142, is preconfigured to be at or proximal to the location of the hotspots formed in the image frame acquired by image sensor 142. Thereby, when discarding the preconfigured portion of the acquired image frame, containing the hotspots, the image of cluster of light sources 170, formed in the image frame acquired by image sensor 142, is discarded as well.

Method 300 includes the following steps:

Step 310: activating duplex imaging apparatus 100.

Duplex imaging apparatus 100, having lower imaging device 110 and upper imaging device 150, each device with alternating clusters of light sources 130 and 170, respectively, and each device preconfigured to acquire sequences of image frames. When a pair of cluster of light sources 130 and 170 is turned ON (activated), the other clusters of light sources 130 and 170 are turned OFF (deactivated). Corresponding image sensors 142 and 182 are activated simultaneously with the activated pair of light clusters 130 and 170.

The order at which the pairs of clusters of light sources 130 and 170 are activated is not important, as long as only one pair of clusters of lights (130 and 170) may be ON at any point in time. Typically, the cycle order maybe {{130*a* & 170*a*}, {130*b* & 170*b*}}, {{130*b* & 170*b*}, {130*a* & 170*a*}} or any other order.

Step 312: Set the preconfigured first pair of clusters of light sources to be the next pair of clusters of light sources.

The sequence of activation of the pairs of clusters of light sources and the acquiring of the image frames in each cycle, providing a pair of output image frames, is preconfigured. Initially, the first pair of clusters of light sources in the sequence is set to be the next pair of clusters of light sources.

Step 320: activating the next pair of clusters of light sources 130 and 170.

The next pair of clusters of light sources 130 and 170 is turned ON, while the other clusters of light sources 130 and 170 are kept OFF.

Step 322: acquiring an image frame of each side of the document 10.

While the next cluster of light sources is ON, the corresponding image sensors 142 and 182 acquire a pair of image frames of document 10, one of each side of document 10. The acquired image frame(s) contains a cluster of hotspots on the side of the image frame respective to the preconfigured positioning of the activated cluster of light sources (130 or 170).

Furthermore, when document 10 is partially transparent, such that when document 10 is partially transparent, cluster of light sources 130 directly illuminates the corresponding image sensor 182, thereby forming an image of cluster of light sources 130 in the images frame acquired by image sensor 182. Similarly, cluster of light sources 170 directly illuminates the corresponding image sensor 142, thereby forming an image of cluster of light sources 170 in the images frame acquired by image sensor 142.

Step 330: deactivating the activated pair of clusters of light sources 130 and 170.

The activated pair of clusters of light sources 130 and 170 is turned OFF, thereby all clusters of light sources 130 and 170 are now OFF.

Step 340: discarding a preconfigured portion of the acquired image frame.

A preconfigured portion of the acquired image frames, containing the hotspots and possibly the image of the cluster of light sources, caused by the direct illumination of the activated cluster of light sources 130 and 170, is discarded.

Step 345: check if this is the last image frame in the current cycle of sequence of image frames.

If the acquired image frame is the last image frame in the current cycle of sequence has been acquired, go to step 350.

Else, go to step 320.

Step 350: concatenating the preconfigured portions of the acquired image frames into an output image frames, having substantially no hotspot traces and no image traces of the clusters of light sources, that were formed in the acquired image frames.

The preconfigured portions of the acquired image frames in a sequence, having substantially no hotspot traces that were formed in the acquired image frames, are concatenated in a preconfigured pattern, to thereby form an output image frame.

Step 355: optionally, check if this is the last cycle-sequence of image frames.

Optionally, if this is not the last cycle-sequence of image frames, go to step 312.

Step 360: changing illumination intensity.

Optionally, each image frame acquisition taken is one of a sequence of image frames, wherein the intensity of the illumination is changed slightly during the vertical blank between consecutive frame acquisitions, of the video frame sequence. This facilitates a better pairing of image frames during concatenation step 350, such that the seam-line formed when concatenating the portions of the acquired image frames, is substantially invisible.

It should be further noted that the order of steps may vary. For example, loop steps 355 and optionally 360 may be performed during a vertical blank of a video frame sequence, starting after step 322 and closing the loop at the entrance of step 320.

For the sake of clarity, light sources 130 and 170 may include any type of light source, preferably LED light sources, including IR, UV and visible light LED light sources or a combination thereof. Optionally, the light source is a halogen light source.

Florescence image of the document may be acquired by illuminating the document with excitation light in UV, NUV or blue wavelength and acquiring data from the green and red sensitive pixels of a color sensitive sensor array. An optical filter designed to block the excitation wavelength may be used to protect the sensor.

In variations of the present, the duplex imaging apparatus may include multiple clusters of light sources, each of which forms a hotspot cluster in the acquired image frame, when the cluster of light sources is activated. Any combination of clusters of light sources may be activated simultaneously, but not all of the clusters of light sources at once. Selected clusters of light sources are alternately activated, such that processor 190 forms a concatenated output image frame from a predetermined number of acquired image frames, such that the concatenated output image frame contains substantially no hotspot traces that were formed in the acquired image frames.

In variations of the present, lower imaging device 110 and upper imaging device 150, may each include a single cluster of light sources, wherein the emitted light beams may be shifted or deflected by a deflection mechanism. The mechanism for deflecting the light beams operatively deflects the light beams to at least two preconfigured illuminating angles, wherein the operatively coupled image sensor is preconfigured to acquire an image frame of the document at each of the at least two illuminating angles.

The deflection mechanism can be, for example, a rotating prism may be placed in the path of the light beams. In another example, mirrors may be disposed on the inner side of the side-walls housing portion 112 and housing portion 152. The light clusters are rotatable to alternately illuminate one mirror, wherein the light beams deflect from the mirror the illuminate document 10. Image frames are acquired when illuminating either mirror, wherein the hotspots are respectively imaged at different location of the image frame.

In variations of the present, lower imaging device 110 and upper imaging device 150 of the duplex imaging apparatus may include two or more image sensors, such that the combined FOV of all image sensors covers a continuity of the glass-window (20) area.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A duplex imaging apparatus for imaging at least one side of a document, having a first side and a second side, the apparatus comprising:
 (a) a processor;
 (b) memory coupled to operate with said processor;
 (c) a lower imaging device having a lower optical-chamber that comprises:
  i. at least one lower-camera mounted inside said lower optical-chamber;

ii. a lower light-source-configuration, disposed inside said enclosed lower optical-chamber, facilitated to directly illuminate said first side of the document from at least two illuminating angles; and iii. a glass-window, wherein the document is operatively disposed on the external surface of said glass-window, wherein said first side of the document is disposed adjacently to said external surface of said glass-window; and (d) an upper imaging device having an upper optical-chamber that comprises:

i. at least one upper-camera mounted inside said upper optical-chamber; and ii. an upper light-source-configuration, disposed inside said enclosed upper optical-chamber, facilitated to directly illuminate said second side of the document from at least two illuminating angles, wherein each of said light source configurations includes at least one cluster of light sources, and wherein said clusters of light sources are operated in a preconfigured sequence;

wherein said lower-camera is preconfigured to acquire an image frame of a portion of said first side of the document being imaged and store said acquired image frame in said memory, and wherein said image acquisition is operatively coupled with the activation of each of said light sources of said lower light-source-configuration at each of said at least two illuminating angles;

wherein said upper-camera is preconfigured to acquire an image frame of a portion of the second side of the document being imaged and store said acquired image frame in said memory, and wherein said image acquisition is operatively coupled with the activation of each of said light sources of said upper light-source-configuration at each of said at least two illuminating angles;

wherein a space is formed between said glass-window and said upper-camera, facilitating the insertion of at least a portion of a user's hand, for insertion and removal of the document;

wherein hotspots are formed in said acquire an image frames at preconfigured locations;

wherein said processor is facilitated to cutout said preconfigured image frame portions containing said hotspots, forming clean portions of said acquired image frame portions;

wherein said processor is facilitated to combine said clean portions of acquired image frames of said first side of the document, to form a first output image frame of said portion of said first side of the document; and wherein said processor is facilitated to combine said clean portions of acquired image frames of said second side of the document, to form a second output image frame of said portion of said second side of the document.

2. The duplex imaging apparatus as in claim 1, wherein cross-illuminations are preconfigured not to form in said clean portions of said acquired image frame portions.

3. The duplex imaging apparatus as in claim 1, wherein each of said light source configurations comprises at least two clusters of light sources.

4. The duplex imaging apparatus as in claim 1, wherein the document is an identity document.

5. The duplex imaging apparatus as in claim 1, wherein each individual light source of said light source configuration is selected from the group of light sources type, including infra red (IR), ultra violate (UV) and visible light (VL).

6. The duplex imaging apparatus as in claim 1, wherein each individual light source of said light source configuration is selected from the group including LED, halogen light sources and fluorescence image.

7. The duplex imaging apparatus as in claim 1, wherein all walls of said optical chamber are opaque, except for said glass-window.

8. The duplex imaging apparatus as in claim 1, wherein all internal walls of said optical-chambers, except for said glass-windows, are painted in black.

9. The duplex imaging apparatus as in claim 1, wherein one or both said light source configurations comprise a cluster of light sources and a mechanism for deflecting the light beams emitted from said cluster of light sources, wherein said mechanism for operatively deflecting said light beams to said at least two illuminating angles.

10. A method for imaging a document, comprising the steps of:

(a) providing an duplex imaging apparatus including:
  i. a processor;
  ii. a lower imaging device having a lower optical-chamber that includes:
    A) at least one lower-camera mounted inside said lower optical-chamber preconfigured to acquire an image frame of a portion of a first side of the document being imaged;
    B) a lower light-source-configuration, disposed inside said enclosed lower optical-chamber, facilitated to directly illuminate said first side of the document from at least two illuminating angles; and
    C) a glass-window, wherein the document is operatively disposed on the external surface of said glass-window, wherein said first side of the document is disposed adjacently to said external surface of said glass-window; and
  iii. an upper imaging device having an upper optical-chamber that includes:
    A) at least one upper-camera mounted inside said upper optical-chamber preconfigured to acquire an image frame of a portion of a second side of the document being imaged; and
    B) an upper light-source-configuration, disposed inside said enclosed upper optical-chamber, facilitated to directly illuminate said second side of the document from at least two illuminating angles; and
  wherein said clusters of light sources are operated in a preconfigured sequence; and
  wherein each of said cameras are preconfigured to acquire an image frame of said portions of the document being imaged, in operative synchronization with the activation of respective clusters of light sources;

(b) performing the following sequence of image acquisition steps, in a preconfigured order, for all preconfigured sets of said clusters of light sources:
  i. activating the next set of clusters of light sources to directly illuminating the preconfigured sides of the document being imaged;
  ii. acquiring corresponding image frames of at least a portion of said preconfigured sides of the document;
  iii. deactivating said next set of clusters of light sources; and
  iv. discarding a preconfigured portion of said acquired image frames, thereby sustaining only clean portion of said acquired image frames;

(c) combining said clean portions of each of said preconfigured sides of frames to form an output image frame for each said preconfigured sides of the document.

11. The method as in claim 10, wherein said set of said clusters of light sources includes one cluster of light sources;

and wherein one image frame is acquired upon said activation of said one cluster of light sources, on the side of the document being illuminated by said one cluster of light sources.

12. The method as in claim 11, wherein said preconfigured sides of the document include both sides of the document.

13. The method as in claim 10, wherein said set of said clusters of light sources includes a pair of clusters of light sources,
   wherein one cluster of light sources illuminates said first side of the document and the other cluster of light sources illuminates said second side of the document;
   wherein image frames of both sides of the document are acquired upon said activation of said clusters of light sources; and
   wherein hotspots are formed in said acquired image frames at preconfigured noisy locations.

14. The method as in claim 13, wherein cross-illuminations are preconfigured to form substantially at said preconfigured noisy locations.

15. The method as in claim 10, wherein said sequence of image acquisition steps is performed a preconfigured number of times, wherein in each of said sequence of image acquisition steps, the illumination intensity of said sets of said clusters of light sources, is different with respect to the other sequences of image acquisition steps.

* * * * *